2,764,575
Patented Sept. 25, 1956

2,764,575
SYNTHETIC RESINS FROM OXACYCLOBUTANE COMPOUNDS AND DICARBOXYLIC ACIDS

Rudolf Köhler and Helmut Pietsch, Dusseldorf, Germany, assignors to Henkel & Cie. G. m. b. H., Dusseldorf, Germany, a German corporation No Drawing. Application September 30, 1952, Serial No. 312,400

Claims priority, application Germany October 8, 1951

18 Claims. (Cl. 260—75)

This invention relates to synthetic resins.
One object of this invention is the production of new heat set synthetic resins. This and still further objects will become apparent from the following description:
The resins in accordance with the invention are obtained by heating compounds which contain at least 2 oxacyclobutane rings in the molecule with compounds containing at least 2 carboxyl groups in the molecule. The carboxyl groups may also be used in the form of their chlorides or anhydrides.
Oxacyclobutane rings have the following formula:

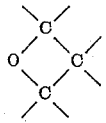

They are also known as 1,3-epoxides. A detailed comprehensive article on oxacyclobutane compounds and methods for their production can be found in S. F. Marrian: "Chemical Reviews," 43, 149–202 (1948).
One method of importance for the industrial preparation of oxacyclobutane compounds is the splitting off of hydrogen chloride or hydrogen bromide from 1,3-halogenhydrins, i. e. compounds which contain a chloromethyl or bromomethyl group and an oxymethyl group bound to the same carbon atom.
In accordance with this method, there can be obtained from pentaerythrite dichlorhydrin the simplest oxacyclobutane compound having two such rings in the molecule, i. e. 2,6-dioxaspiro-3,3-heptane of the formula:

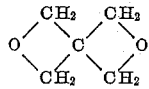

which in the following, for the sake of brevity, will be called dioxaspiroheptane. The splitting off of the hydrogen halide is effected by heating the chlorhydrin with alcoholic alkali, by which there is meant alkali alcoholate and alcoholic alkali hydroxide solution. The reaction is effected by heating with the alcoholic solution of the other reactant under reflux. Depending on the reaction conditions, particularly the ratio of pentaerythrite dichlorhydrin and alkali there are obtained in this connection different quantities of dioxaspiroheptane and of substances containing oxacyclobutane rings the structure of which is partially unknown. For example, there are produced oxacyclobutane derivatives of the general formula:

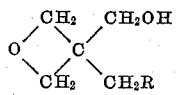

in which R can be the following radicals:

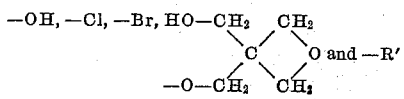

R' represents the radical of the alcohol used.

Upon reacting the pentaerythrite dichlorhydrin with alcoholic alkali at least 1 mol of alkali for each mol of pentaerythrite dichlorhydrin should be used. The quantity of alkali can be increased up to 3 mols per mol of pentaerythrite dichlorhydrin. As alcohols, there can be used the low aliphatic members having 1 to 6 carbon atoms in the molecule and preferably 2 and 3 carbon atoms in the molecule. However, there are also known other methods of preparing such oxacyclobutane derivatives; for instance, instead of the pentaerythrite dichlorhydrin, its sulfuric acid ester can be treated with correspondingly larger quantities of alcoholic alkali. This method, which is described in U. S. A. patent application 297,982 gives essentially the same oxacyclobutane compounds.
All of these compounds having at least two oxacyclobutane rings in the molecule can be used for carrying out the method of the present invention. However, the mono-oxacyclobutane compounds can also be converted into poly-oxacyclobutane compounds by means of 2-methylol-2-chloromethyl-oxacyclobutane of the formula:

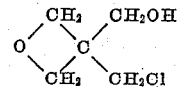

This is done in the following manner:
The 2-methylol-2-chloromethyl-oxacyclobutane is polymerized alone or mixed with other oxacyclobutane compounds with the use of suitable catalysts, and there is obtained when the said oxacyclobutane compound is used by itself, polyethers of trimethylene glycol of the general formula:

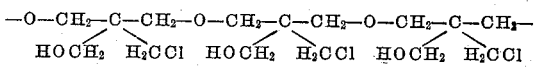

Hydrogen chloride can be split off from these polyethers by treatment with alcoholic alkali and a new oxacyclobutane ring can thus be created from the methylol and chloromethyl groups. This reaction is carried out in the same manner as has already been described in connection with the pentaerythrite dichlorhydrin. It does not go entirely to completion even when using a large excess of alkali so that methylol and chloromethyl radicals always remain in the molecule, the quantity thereof depending on the reaction conditions and especially on the duration of the treatment and the quantity of alkali used which can amount to 0.6 to 3 times the quantity theoretically necessary. If the 2-methylol-2-chloromethyl-oxacyclobutane is not polymerized by itself but in mixture with other oxacyclobutane compounds, there are obtained co-polymers the 1,3-chlorhydrin groups of which can be converted into oxacyclobutane rings in the manner which has been described. If di- or poly-oxacyclobutane compounds were present during the polymerization, there are obtained latticelike polymerizations which in case of too extensive polymerization can lead to insoluble resins. The polymerization should, therefore, be interrupted while the polymers are still molten or soluble in organic solvents, of which fact one should convince oneself during the reaction by means of spot samples. The quantity of oxacyclobutane compounds which are polymerized in mixture with the 2-methylol-2-chloromethyl-oxacyclobutane should not be greater than twice the amount of the latter and it is preferable to use at most the same quantity by weight. The 1,3-chlorhydrin content of the co-polymer can only be reduced down to the amount which is necessary for obtaining a resin which contains at least 2% by weight of 1,3-epoxide oxygen. In this connection it must be borne in mind that only a part of the total chlorine can be split off and then only a part thereof furthermore leads to the formation of oxacyclobutane rings. If the polyethers of trimethylene glycol which contain the oxacyclobutane rings are prepared only from mono-oxacyclobutane derivatives, the polyether obtained is a practically non-interlaced linear polymer. It can be slightly interlaced by treatment with the same catalysts as used in the polymerization of the 2-methylol-2-chloromethyl-oxacyclobutane, but only to such an extent that the resin obtained is still fusable and soluble in organic solvent.

All these polymerizations are produced by fundamentally the same manner of operation; the starting material is heated with catalysts which are able to split off inner ethers. Such catalysts are for instance Friedel-Crafts catalysts, particularly boron fluoride but aluminum chloride, tin chloride and zinc chloride can also be used. The quantity of catalyst used depends upon its activity; in most cases it will not substantially exceed quantities of 5%. Boron fluoride is a very active catalyst; it can be used in quantities of 0.05 to 1%. Less active catalysts such as aluminum, tin or zinc chloride, caustic soda, caustic potash, pyridine, piperidine, triethylamine and others should be added in quantities of 1 to 10%. In the case of organic bases, these quantities to be sure can be substantially exceeded inasmuch as the bases are in part also incorporated in the resin. The catalysts are mixed with the oxacyclobutane compounds and the mixture, if necessary, is heated. The temperatures to be used differ, depending on the reactivity of the starting material and the activity of the catalyst and lie in the range of +20 to +150° C. The reaction begins, with the use of active catalysts, already at room temperature and can be accelerated by increase in the temperature.

The above statements were intended to show methods which can be adopted for the preparation of compounds having at least 2 oxacyclobutane rings in the molecule. The method, however, is not limited to the working of di- or polyoxacyclobutane compounds prepared in this manner. All such compounds having at least two oxacyclobutane rings in the molecule which may be low molecular or high molecular or non-interlaced or, to a certain extent, interlaced represent starting material for the carrying out of the method of the invention. The other initial substance is a group of compounds which contain at least two carboxyl groups in the molecule. The carboxyl groups can be present in the form of halides or anhydrides. There are preferred anhydrides of dicarboxylic acids such as for instance malonic acid, maleic acid, succinic acid, adipic acid, sebacic acid and others. In addition, there may be used polyesters or polyamides the chains of which contain carboxyl groups at the ends.

For the preparation of the resins of the present invention, the carboxylic acid component is mixed with the oxacyclobutane component and the mixture is fused.

The quantity ratio of oxacyclobutane component to carboxylic acid component can vary between 10:1 and 1:1. Preferably, the ratio is such that there are not more carboxyl groups present than oxacyclobutane rings, so that no water is produced during the hardening reaction. If the oxacyclobutane component consists to a far-reaching extent of oxacyclobutane rings, as is the case in connection with dioxaspiroheptane, and if there are relatively few carboxyl groups or their anhydrides or chlorides present in the carboxylic acid component, as is the case in connection with linseed oil-maleic acid condensation products, the above indicated quantity ratio can be strongly shifted in such case and the carboxylic acid component used in large excess.

The temperatures to be applied vary, depending on the reactivity of the starting materials and also depending on whether it is intended to produce the hardened resin directly in a single operation or whether a soluble, fusable, hardenable intermediate condensation product is desired. Although even at temperatures of 150° to 200° C. and a short time of reaction a resin which is still fusable can be obtained, the reaction can be better controlled if it is carried out over a longer time at temperatures of 80° to 140° C. and preferably 100° to 130° C. In the preparation of the intermediate condensation product, the heating is advisedly continued at least until no deposit of crystals can any longer be noticed upon cooling. If it is desired to harden the not-yet-hardened reaction product obtained thereby or if it is desired to obtain immediately completely hardened resins, the operation is advisedly carried out at temperatures of 120° to 200° C. and preferably 130° to 180° C. By the splitting off of oxacyclobutane rings, there are formed in this connection condensation products which lead via intermediate stages to three dimensionally interlaced non-fusable resins which are insoluble in all solvents.

The condensation can be accelerated by the addition of catalysts. Suitable catalysts are, for instance, Friedel-Crafts catalysts, particularly boron fluoride, but also aluminum chloride, zinc chloride and others, as well as inorganic and organic alkalis, strong inorganic and organic acids such as, for instance, p-toluenesulfonic acid, sulfuric acid or their semiesters, etc. The quantity of catalyst used varies according to the activity of the catalyst, but in most cases, will not substantially exceed quantities of 10%.

The properties of the intermediate products obtained in the course of the reaction and of the resins obtained, of course, depend to a far reaching extent on the structure and particularly on the molecular size of the starting products and on the condensation conditions. The hardenable intermediate products are liquid, viscous or solid depending on the starting material and reaction conditions, but are, in any event, still fusable and can be used as casting resins, adhesives, cements, coatings or the like. The great importance of the resins obtained in accordance with the present invention resides in the fact that no by-products are given off in the reaction. For this reason the shrinkage upon hardening is much less than in connection with synthetics which are produced with the splitting off of water, ammonia, carbon dioxide, etc. The resins adhere extremely strongly to all possible substrates, including glass or metal, as well as ceramic products and, therefore, can be used as adhesives with particular advantage in cases where the strength of the bond is subjected to strong stresses.

The following examples are given to illustrate the invention and not to limit the same:

Example 1

100 grams dioxaspiroheptane are fused together with 50 to 70 grams phthalic anhydride and then heated for a few hours at 110° to 130° C. until the mass is viscous in the hot but is solid at room temperature. The resin obtained can be used in solid form, as a powder, or dissolved in organic solvents as an adhesive. By further heating for several hours at 150° to 180° C., the reaction product becomes infusable and insoluble. The hardened resin represents a colorless to slightly yellow transparent mass which has extraordinary strength. The resin adheres firmly to all substrates. By the addition of 5 to 15 grams piperidine the hardening can be carried out in a shorter time and/or at lower temperatures.

Example 2

From 30 grams glycerine and 100 grams phthalic anhydride, a polyester is prepared by heating for 4 hours at 200° C. The product has an acid number of 120 to 130. 100 grams of this condensation product are fused together and mixed well with 20 to 60 grams dioxaspiroheptane at 120 to 130° C. By heating to 150 to 170° C. there are obtained infusable, hardened masses. The products are glass-clear and of high strength. By reducing the quantity of spiroheptane, softer synthetic resins can be obtained while, by increasing the quantity of spiroheptane, harder synthetic resins can be obtained.

Example 3

100 grams dioxaspiroheptane are heated with 60 grams maleic anhydride for 4 hours at 120 to 130° C. The resin obtained can be further condensed at 150° C. into insoluble, infusable hard masses.

Example 4

100 grams dioxaspiroheptane are heated with 100 grams maleic anhydride for 4 hours at 100 to 130° C. and then further condensed at 150° C. into an insoluble, infusable product. The product is more elastic than the synthetic resin obtained in accordance with Example 3.

Example 5

100 grams dioxaspiroheptane and 128 grams adipic anhydride are heated with 2 grams p-toluenesulfonic acid at 120 to 130° C. for 4 to 6 hours. A soft gel is formed which can be hardened at 170° C.

Example 6

100 grams dioxaspiroheptane are heated with 136 grams adipic acid at 120 to 130° C. for 4 hours. There is obtained a viscous product which can be further condensed at 150 to 160° C. into a synthetic resin which is elastic and soft in the cold.

Example 7

100 grams dioxaspiroheptane (1 mol) are heated with 73 grams adipic acid (½ mol) in an oil bath to 150–170° C. After 4 to 6 hours there is obtained a light-brownish viscous oil which is heated in a vacuum of 2 to 4 milligrams Hg to 230° C. in order to remove small quantities of unchanged reagents. There remains a highly viscous oil with an acid number of 0, which is insoluble in alcohol and benzene but soluble in acetone and dioxan. It has, in all probability, the following structure:

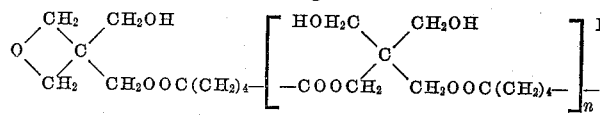

Upon stirring 100 grams of this resin with 1 cc. 10% BF₃-ether solution, the mass solidifies already at room temperature, forming a tough, hard product.

Example 8

100 grams dioxaspiroheptane are fused together with 200 grams terephthalic chloride and carefully heated at 100° C. A brittle, hard resin is formed with a strong exothermic reaction.

Example 9

580 grams of pentaerythrite dichlorhydrin are heated with 3500 cc. absolute alcohol in which 370 grams potassium hydroxide are dissolved on a water bath for ½ hour to the boiling point under reflux. Precipitated salt is filtered off by suction, the filtrate is extrated with ether, the ethereal layer is dried with sodium sulfate and, after driving off the ether vacuum, is sublimed and distilled. 340 grams of the reaction product thus obtained give 110 grams dioxospiroheptane in the vacuum sublimation. The residue thereof is distilled and consists of 170 grams of a fraction passing over at BP₄=110–130° C., which contains mainly the following compounds:

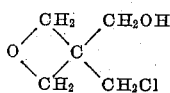

and

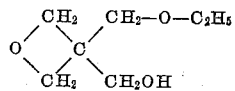

There remains 60 grams of a viscous yellowish residue which contains compounds having two and more oxacyclobutane rings in the molecule. (Similar results are obtained when the potassium hydroxide is replaced by a corresponding amount of sodium hydroxide.)

50 grams of this residue are precondensed with 40 grams phthalic anhydride for a few hours at 120 to 130° C. and then hardened at 150° C. there is obtained a resin having high mechanical strength.

Example 10

450 grams of linseed oil are heated with 50 grams maleic anhydride for 1 hour at 200° C., then brought to 230° C. and left for two hours at this temperature. 100 grams of this reaction product are heated with 10 grams dioxaspiroheptane at 210° C. until the acid number has dropped to below 10. The product has properties similar to an alkyd resin and is suitable as raw material for laquers and varnishes.

Example 11

176 grams (1 mol) pentaerythrite dichlorhydrin are dissolved in 500 cc. absolute alcohol and added while cooling gradually to a solution of 39.1 grams (1 mol) potassium and 1500 cc. absolute alcohol. The mixture is boiled for one to two hours under reflux, the potassium chloride which has separated out is filtered off, the alcohol is distilled off to the greater extent; it is then extracted with ether, shaken twice with 20 cc. of water, dried with anhydrous magnesium sulfate and distilled. At BP₂₋₃= 102–107° C. there passes over a fraction (70–80 grams) which consists mainly of a compound of the composition:

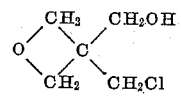

To 68 grams of this 2-methylol-2-chloromethyloxacyclo-

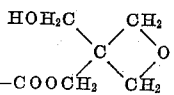

butane there is added 1 cc. 4.5% BF₃-ether solution and the mixture is gradually heated to 100–150° C. The polymerization takes place at the beginning with a strong exothermic reaction. Instead of the BF₃-ethereal solution there can also be used 2 grams AlCl₃ or FeCl₃ as polymerization catalysts. After the termination of the main reaction, it is heated a further 2 hours at 130 to 150° C. The polyether obtained constitutes a liquid which is stringy and highly viscous at room temperature, which may have the following constitution:

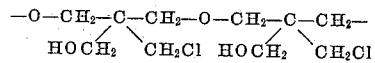

The resin obtained is heated at the boiling point for ½ hour in 100 cc. absolute alcohol and after the addition of a solution of 40 grams KOH in 200 cc. alcohol. The KCl which precipitates is filtered off from the resin solution. When the solvent has been distilled off and the product has been washed until neutral, there is obtained a polyether of trimethylene glycol containing an oxacyclobutane ring having a molecular weight of 960 and 8 to 9.5% by weight of 1,3-epoxide oxygen. The resin is partially water-soluble.

It is fused together with an amount of phthalic anhydride equal to 35 to 40% of its weight and heated until no further precipitation of crystals is noticed upon cooling. This is the case after 10 minutes at a temperature of 120 to 140° C.

Small quantities of the resin are applied to strips of pure aluminum. The strips are placed together and hardened for 1 hour at 120 to 140° C. The bond has a shear strength of about 1 kg./mm.².

Example 12

To the polyether containing oxacyclobutane rings prepared in accordance with Example 11 there is added an amount of maleic anhydride equal to 25% of its weight and the mixture is heated for 10 minutes at 120 to 140° C. If the still fusable intermediate product is hardened over the course of 30 to 60 minutes at 120 to 140° C., there are obtained infusable and insoluble clear, slightly yellow to colorless resins which are completely free of bubbles and which are hard but elastic even at furnace temperature. The strength of the resins is greater if an amount of maleic anhydride equal to 40% of the weight of the oxacyclobutane resin is used. An increase in strength can also be obtained by heating for a longer period of time up to 10 hours.

Example 13

20 grams of the polyoxacyclobutane resin prepared in accordance with Example 11 are heated in an oil bath under reflux with 8.6 grams piperidine. With a slight increase of viscosity produced by incipient interlacing there is produced a resin having a 1,3-epoxide content of 3–3.3% and an $N_2$ content of 1.6 to 1.8%. If an amount of phthalic anhydride or maleic anhydride equal to 50 to 100% of its weight is added to this initial resin, resins which are hard and elastic and can be destroyed only by strong hammer blows are obtained at 110 to 130° C. in the course of 30 to 60 minutes.

Example 14

3 mols of pentaerythrite dichlorhydrin are added to a solution of 4.5 mols KOH and 3 mols potassium alcoholate in 3.5 liters absolute alcohol. After distilling off a good ½ of the alcohol practically the theoretical quantity of KCl will deposit. By vacuum sublimation, 130 to 140 grams 2,6-dioxa-3,3-spiroheptane and 90–110 grams of an oil of $BP_3=100-103°$ C. are recovered. It is free of chlorine and has practically the theoretical ethoxyl content of 31 to 32%, from which it follows that there must be concerned in this connection the ether

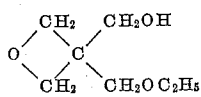

70 grams of the oxacyclobutane compound prepared in this manner and 70 grams 2-methylol-e-chloromethyl-oxacyclobutane are dissolved in 140 cc. dioxan and heated, after the addition of 8 cc. 4.5% $BF_3$-ethereal solution under reflux to the boiling point. After two hours the reaction product is already viscous; after four hours a sticky, stringy resin has formed, as can be noted on basis of a sample specimen after the evaporation of the solvent. 2 grams $SnCl_4$ or 4 grams $FeCl_3$ can also be used as catalyst with similar results. 30 grams KOH in 300 cc. alcohol are added to the dioxan solution and 30 grams KCl are caused to precipitate by boiling for ½ hour under reflux. For working up, the resin remaining after the expelling of the dioxan alcohol mixture is washed neutral with water. It has become water-insoluble by the addition of the oxacyclobutane ether, has a molecular weight of 1500, still contains 2.5 to 3% chlorine and has a content of 3–3.5% 1,3-epoxide oxygen. Intermediate condensation products are prepared from this resin, as described in the previous examples, by fusing with phthalic or maleic anhydride. These can be poured into molds and hardened by heating for five to ten minutes at temperatures of 150 to 180° C. The intermediate condensation products are also suited as adhesives for glass, porcelain, stoneware, metal, etc.

Example 15

20 parts of a polyoxacyclobutane resin according to Example 14 which has a 1,3-epoxide oxygen content of 3.2%, a residual chlorine content of 5.5% and an average molecular weight of 480 are fused together with 5 to 13 parts phthalic anhydride at 120 to 130° C. and hardened in the course of 1 to 3 hours at 130 to 140° C. The hardened resins are, at the hardening temperature, solid masses of the nature of hard rubber but clear, free of bubbles and having a pale yellow color. In the cold, they are so hard and elastic that they cannot be destroyed by strong hammer blows on a stone support.

Example 16

If one proceeds in the same manner as in Example 15 but using maleic anhydride, there are obtained intermediate condensation products which when applied to sheets of Duralumin and hardened overnight at 130° C. after the sheets have been placed on top of each other, give the following shear strengths:

| 1,3-Epoxide Resins (parts by weight) | Maleic Anhydrides (parts by weight) | Shear Strength (kg./mm.²) |
|---|---|---|
| 2.0 | 0.3 | 2.6–2.7 |
| 2.0 | 0.5 | 1.8–1.9 |
| 2.0 | 0.7 | 2.7–3.2 |
| 2.0 | 0.9 | 2.6–3.1 |
| 2.0 | 1.1 | 2.1–2.5 |
| 2.0 | 1.3 | 1.8 |

Also in this case the hardened resins are free of bubbles, of a light amber color, are scarcely contracted for instance with the addition of 35% maleic acid and withstand strong mechanical stresses.

Example 17

Proceeding in the same manner as in Example 15 and using a mixture of phthalic and adipic anhydride, the quantity ratio of oxacyclobutane resin and anhydride mixture being between 1:0.1 and 1:1 and the ratio of phthalic anhydride to adipic anhydride varying between 10:1 and 1:10; there are obtained solid masses varying from brittle-hard to tough-elastic which can be in part machined.

When starting materials of higher molecular size—polyoxacyclobutane compounds as well as polycarboxylic compounds—are used, the molecular size of these compounds should be low enough, that the materials are still fusable at the reaction temperature. Starting materials up to a molecular size of about 2000–3000 may be used. Although the application of pressure is not necessary for the hardening reaction, the working under pressure may be of advantage, especially, when materials should be bound together and when laminated or molded articles are manufactured. The applied pressure may be in the range of 0–250, preferably 5–70 kg./cm.²

We claim:

1. As a new synthetic resin a condensation product of a compound having at least 2 oxyacyclobutane rings with a member selected from the group consisting of polycarboxylic acids, polycarboxylic acid anhydrides, and polycarboxylic acid chlorides.

2. Synthetic resin according to claim 1 in which said compound having at least 2 oxacyclobutane rings is 2,6-dioxaspiro-3,3-heptane.

3. Synthetic resin according to claim 1 in which said compound having at least 2 oxacyclobutane rings is a polyether of trimethylene glycol.

4. Synthetic resin according to claim 3 in which said polyether contains an ether radical having the formula

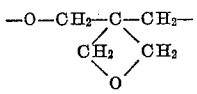

5. Synthetic resin according to claim 1 in which said compound containing at least 2 oxacyclobutane rings is a partially interlaced fusible polyether soluble in organic solvents.

6. Synthetic resin according to claim 1 in which group member is a dicarboxylic acid having 3 to 10 carbon atoms.

7. Synthetic resin according to claim 1 in which said group member is a polyester of a dicarboxylic acid having terminal carboxyl groups.

8. Method for the preparation of synthetic resins which comprises heating a compound containing at least 2 oxacyclobutane rings with a member selected from the group consisting of polycarboxylic acids, polycarboxylic acid anhydrides, and polycarboxylic acid chlorides and recovering a hardened synthetic resin.

9. Method according to claim 8 in which said compound containing at least 2 oxacyclobutane rings is 2,6-dioxaspiro-3,3-heptane.

10. Method according to claim 8 in which said polyoxacyclobutane compound is a polyether of trimethylene glycol.

11. Method according to claim 10 in which said polyether contains an ether radical of the formula

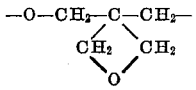

12. Method according to claim 8 in which said compound having at least 2 oxacyclobutane rings is a fusable, partially interlaced polyether soluble in organic solvents.

13. Method according to claim 8 in which said group member is a dicarboxylic acid having 3 to 10 carbon atoms in the molecule.

14. Method according to claim 8 in which said group member is a polyester of a dicarboxylic acid having terminal carboxyl groups.

15. Method according to claim 8 in which said heating is interrupted before complete hardening of the synthetic resin.

16. Method according to claim 8 in which said heating is effected in the presence of a catalyst.

17. Synthetic resins according to claim 1, in which said compound having at least 2 oxacyclobutane rings and said group member are present respectively in said resin in the ratio of between 10:1 and 1:1.

18. Method according to claim 8, which includes heating said compound containing at least 2 oxacyclobutane rings and said group member in the ratio of between 10:1 and 1:1 respectively.

References Cited in the file of this patent

UNITED STATES PATENTS

| | | |
|---|---|---|
| 2,296,225 | Ulrich | Sept. 15, 1942 |
| 2,495,305 | Wyler | Jan. 24, 1950 |

FOREIGN PATENTS

| | | |
|---|---|---|
| 518,057 | Great Britain | Feb. 15, 1940 |